(12) United States Patent
Takao et al.

(10) Patent No.: US 10,138,315 B2
(45) Date of Patent: Nov. 27, 2018

(54) FLUORINATED COMPOUND-CONTAINING COMPOSITION, METHOD FOR ITS PRODUCTION, COATING LIQUID, HARD COAT LAYER-FORMING COMPOSITION AND ARTICLE

(71) Applicant: ASAHI GLASS COMPANY, LIMITED, Chiyoda-ku (JP)

(72) Inventors: Kiyotaka Takao, Chiyoda-ku (JP); Taiki Hoshino, Chiyoda-ku (JP)

(73) Assignee: AGC INC., Chiyoda-ku (JP)

( * ) Notice: Subject to any disclaimer, the term of this patent is extended or adjusted under 35 U.S.C. 154(b) by 0 days.

(21) Appl. No.: 15/679,198

(22) Filed: Aug. 17, 2017

(65) Prior Publication Data

US 2018/0022850 A1 Jan. 25, 2018

Related U.S. Application Data

(63) Continuation of application No. PCT/JP2016/063465, filed on Apr. 28, 2016.

(30) Foreign Application Priority Data

Apr. 30, 2015 (JP) ................................. 2015-092930

(51) Int. Cl.
| | | |
|---|---|---|
| *C08F 2/46* | (2006.01) | |
| *C08F 2/50* | (2006.01) | |
| *C08G 61/04* | (2006.01) | |
| *C08F 290/06* | (2006.01) | |
| *C08G 18/67* | (2006.01) | |
| *C09D 4/00* | (2006.01) | |
| *C09D 175/08* | (2006.01) | |
| *C09D 175/14* | (2006.01) | |
| *C08G 18/28* | (2006.01) | |
| *C08G 18/79* | (2006.01) | |
| *C09D 151/08* | (2006.01) | |
| *C09J 4/00* | (2006.01) | |

(52) U.S. Cl.
CPC ............ *C08F 290/067* (2013.01); *C08F 2/50* (2013.01); *C08F 290/06* (2013.01); *C08G 18/2885* (2013.01); *C08G 18/67* (2013.01); *C08G 18/792* (2013.01); *C09D 4/00* (2013.01); *C09D 151/08* (2013.01); *C09D 175/08* (2013.01); *C09D 175/14* (2013.01); *C09J 4/00* (2013.01)

(58) Field of Classification Search
CPC . C08F 290/067; C09D 151/08; C08G 18/792; C08G 18/2885
USPC ........... 522/39, 33, 6, 71, 189, 184, 1; 520/1
See application file for complete search history.

(56) References Cited

U.S. PATENT DOCUMENTS

| | | | | |
|---|---|---|---|---|
| 2004/0181008 A1* | 9/2004 | Hanazawa | ......... | C08G 18/2885 524/589 |
| 2011/0135905 A1 | 6/2011 | Wakita et al. | | |
| 2015/0344703 A1* | 12/2015 | Takao | ...................... | C09D 4/00 428/421 |

FOREIGN PATENT DOCUMENTS

| | | |
|---|---|---|
| JP | 2005-519146 | 6/2005 |
| JP | 3963169 | 8/2007 |
| JP | 2009-256598 | 11/2009 |
| JP | 2010-095695 | 4/2010 |
| JP | 2011-116947 | 6/2011 |
| JP | 2012-241060 | 12/2012 |
| WO | WO 03/002628 A1 | 1/2003 |
| WO | WO 2007/102370 A1 | 9/2007 |

OTHER PUBLICATIONS

International Search Report dated Jul. 19, 2016 in PCT/JP2016/063465 filed on Apr. 28, 2016.
U.S. Appl. No. 14/821,941, filed Aug. 10, 2015, 2015/0344703 A1, Kiyotaka Takao, et al.

* cited by examiner

*Primary Examiner* — Jessica Whiteley
(74) *Attorney, Agent, or Firm* — Oblon, McClelland, Maier & Neustadt, L.L.P.

(57) ABSTRACT

A composition including a fluorinated compound (A), a compound (B) and a solvent (S1), wherein the content of the fluorinated compound (A) in the composition is from 5 to 30 mass % to the composition, and the content of the compound (B) is from 0.1 to 2 mass % to the composition, wherein the fluorinated compound (A) has no isocyanate group and has a portion derived from a compound (a) having a poly (oxyperfluoroalkylene) chain and an active hydrogen-containing group, a portion derived from a compound (b) having a polymerizable carbon-carbon double bond and an active hydrogen-containing group, and a portion derived from a polyisocyanate (c), and wherein the compound (B) has a polymerizable carbon-carbon double bond and an active hydrogen-containing group.

17 Claims, No Drawings

Ｕ

US 10,138,315 B2

FLUORINATED COMPOUND-CONTAINING COMPOSITION, METHOD FOR ITS PRODUCTION, COATING LIQUID, HARD COAT LAYER-FORMING COMPOSITION AND ARTICLE

TECHNICAL FIELD

The present invention relates to a fluorinated compound-containing composition, a method for its production, a coating liquid containing the fluorinated compound-containing composition, a hard coat layer-forming composition made of the coating liquid and an article having a hard coat layer formed from the composition.

BACKGROUND ART

Optical articles, displays, optical recording media and the like usually have a hard coat layer for preventing scratches, etc. on their surface.

Further, such articles are desired to have antifouling properties i.e. properties whereby stains (such as fingerprints, sebum, sweat, cosmetics, food, oily ink, etc.) are less likely to adhere to the surface, and even if such stains have adhered to the surface, they can be easily removed. For example, if stains adhere to the surface of the spectacle lens, they interfere with good vision and deteriorate visual quality. If stains adhere to the surface of an optical recording medium, a failure in recording or reproduction of signals may occur. If stains adhere to the surface of a display, its visibility deteriorates, and in the case of a touch panel display, the operation efficiency tends to be adversely affected.

As a substance capable of imparting antifouling properties to a hard coat layer, a fluorinated compound has been proposed which is obtained by reacting triisocyanate, a perfluoropolyether having one active hydrogen, and a monomer having active hydrogen and a polymerizable carbon-carbon double bond in a reaction solvent (Patent Document 1).

PRIOR ART DOCUMENT

Patent Document

Patent Document 1: Japanese Patent No. 3963169

DISCLOSURE OF INVENTION

Technical Problem

However, according to studies conducted by the present inventors, the fluorinated compound-containing composition comprising a fluorinated compound and a reaction solvent obtained by the method described in Patent Document 1 has the following problems.

At the time of distilling off the reaction solvent contained in the fluorinated compound-containing composition, in order to replace it with another solvent suitable for coating, the fluorinated compound-containing composition is likely to foam. Then, it is not possible to lower the pressure reduction degree, whereby it takes time for distillation, and the productivity tends to be insufficient.

At the time of filling the fluorinated compound-containing composition having the solvent replaced, into a container, for shipment, etc., the fluorinated compound-containing composition may foam. Then, in order to prevent the foamed fluorinated compound-containing composition from overflowing from the container, it is necessary to slow down the filling rate, whereby the productivity tends to be insufficient.

Further, according to studies conducted by the present inventors, in Patent Document 1, compatibility between the fluorinated compound and the above-mentioned another solvent suitable for coating is insufficient. Therefore, the composition tends to be cloudy.

The present invention has an object to provide a fluorinated compound-containing composition which is capable of imparting excellent antifouling properties (oily ink repellency, fingerprint stain removability) to an object (such as a hard coat layer) and which is excellent in compatibility and has foaming suppressed, and a method for its production; a coating liquid excellent in compatibility and capable of forming an object excellent in antifouling properties; a hard coat layer-forming composition excellent in compatibility and capable of forming a hard coat layer excellent in antifouling properties; and an article having a hard coat layer excellent in antifouling properties.

Solution to Problem

The present inventors have made extensive studies with respect to foaming of a fluorinated compound-containing composition, and as a result, they have found it possible to make compatibility of the fluorinated compound-containing composition excellent and to suppress foaming, by incorporating to the fluorinated compound-containing composition a compound having a polymerizable carbon-carbon double bond and an active hydrogen-containing group in a specific content, and thus have accomplished the present invention.

The present invention provides a fluorinated compound-containing composition, a method for producing a fluorinated compound-containing composition, a coating liquid, a hard coat layer-forming composition and an article, having the following constructions [1] to [12].

[1] A composition characterized by comprising the following fluorinated compound (A), the following compound (B) and a solvent (S1), wherein the content of the following fluorinated compound (A) in the composition is from 5 to 30 mass % to the composition, and the content of the following compound (B) is from 0.1 to 2 mass % to the composition, Fluorinated compound (A): a fluorinated compound which is a compound having a portion derived from a compound (a) having a poly(oxyperfluoroalkylene) chain and an active hydrogen-containing group, a portion derived from a compound (b) having a polymerizable carbon-carbon double bond and an active hydrogen-containing group, and a portion derived from a polyisocyanate (c), and which has no isocyanate group, Compound (B): a compound having a polymerizable carbon-carbon double bond and an active hydrogen-containing group.

[2] The composition according to [1], wherein at least part of said compound (B) is said compound (b).

[3] The composition according to [1] or [2], wherein each of said compound (b) and said compound (B) other than the compound (b) is a compound having one hydroxy group.

[4] The composition according to any one of [1] to [3], wherein said compound (a) is a compound having one hydroxy group.

[5] A method for producing a composition as defined in any one of [1] to [4], which comprises reacting said compound (a), said compound (b) and said polyisocyanate (c) in said solvent (S1), wherein the amount of said polyisocyanate (c)

used is at least equal in chemical equivalent to said compound (a) and less than equal in chemical equivalent to the total in chemical equivalent of said compound (a) and said compound (b), and if necessary after completion of the reaction, said compound (B) is added and by adjusting the amount of the solvent (S1) and adjusting the total amount of an unreacted compound (b) and said optionally-added compound (B), the contents of said fluorinated compound (A) and said compound (B) are adjusted to be within said ranges of their contents.

[6] The method according to [5], wherein said compound (a) and an excess amount in chemical equivalent of the polyisocyanate (c) are reacted in the solvent (S1) to produce a reaction intermediate having an isocyanate group, and then, the compound (b) in an amount exceeding equal in chemical equivalent to said reaction intermediate is added to the reaction system, thereby to react the compound (b) to said reaction intermediate.

[7] The method according to [6], wherein by adjusting the amount of said compound (b) used in the reaction, the content of said compound (B) is adjusted to be within said range of its content without adding said compound (B) after completion of the reaction.

[8] A composition characterized by comprising the following fluorinated compound (A), the following compound (B) and the following solvent (S2), wherein the content of the following fluorinated compound (A) in the composition is from 5 to 30 mass % to the composition, and the content of the following compound (B) is from 0.1 to 2 mass % to the composition, Fluorinated compound (A): a fluorinated compound which is a compound having a portion derived from a compound (a) having a poly(oxyperfluoroalkylene) chain and an active hydrogen-containing group, a portion derived from a compound (b) having a polymerizable carbon-carbon double bond and an active hydrogen-containing group, and a portion derived from a polyisocyanate (c), and which has no isocyanate group, Compound (B): a compound having a polymerizable carbon-carbon double bond and an active hydrogen-containing group, Solvent (S2): a solvent containing a non-fluorinated organic solvent or a fluorinated organic solvent having an active hydrogen-containing group.

[9] A method for producing the fluorinated compound-containing composition as defined in [8], characterized by substituting at least part of the solvent (S1) in the composition as defined in any one of [1] to [4] by the solvent (S2).

[10] A coating liquid characterized by comprising the composition as defined in any one of [1] to [4], or the fluorinated compound-containing composition as defined in [8], a photopolymerizable compound (excluding said fluorinated compound (A) and said compound (B)), and a photopolymerization initiator.

[11] A hard coat layer-forming composition made of the coating liquid as defined in [10].

[12] An article characterized by comprising a substrate, and a hard coat layer formed from the hard coat layer-forming composition as defined in [11].

Advantageous Effects of Invention

The fluorinated compound-containing composition of the present invention is one which is capable of imparting excellent antifouling properties to an object, and which is excellent in compatibility and has foaming suppressed.

According to the method for producing a fluorinated compound-containing composition of the present invention, it is possible to produce a fluorinated compound-containing composition which is capable of imparting excellent antifouling properties to an object, and which is excellent in compatibility and has foaming suppressed.

The coating liquid of the present invention is capable of forming an object excellent in compatibility and excellent in antifouling properties.

The hard coat layer-forming composition of the present invention is capable of forming a hard coat layer excellent in antifouling properties.

The article of the present invention has a hard coat layer excellent in antifouling properties.

DESCRIPTION OF EMBODIMENTS

In this specification, a compound represented by the formula (1) will be referred to as a compound (1). Compounds represented by other formulae will be referred to in a similar manner.

In this specification, the fluorinated compound-containing composition, the coating liquid and the hard coat layer-forming composition may be simply collectively referred to as the "composition".

In this specification, meanings of the following terms are as follows.

A "poly(oxyperfluoroalkylene) chain" means a molecular chain having at least two oxyperfluoroalkylene units chained.

An "oxyperfluoroalkylene unit" means a unit having an oxygen atom at one terminal of a perfluoroalkylene group, and its chemical formula shall be presented by placing the oxygen atom to the right hand side of the perfluoroalkylene group.

An "etheric oxygen atom" means an oxygen atom forming an ether bond (—O—) between carbon-carbon atoms.

A "fluoroalkylene group" means a group having some or all of hydrogen atoms in an alkylene group substituted by fluorine atoms, and a "perfluoroalkylene group" means a group having all hydrogen atoms in an alkylene group substituted by fluorine atoms.

A "perfluoroalkyl group" means a group having all of hydrogen atoms in an alkyl group substituted by fluorine atoms.

A "(meth)acryloyl group" is a generic term for an acryloyl group and a methacryloyl group.

A "(meth)acrylate" is a generic term for an acrylate and a methacrylate.

A "polyisocyanate" means a compound having at least two isocyanate groups.

An "object" means one to which antifouling properties are to be imparted. The object may, for example, be a hard coat layer, a liquid-repellent layer, a release layer, a molded product, etc.

[Composition Containing Fluorinated Compound]

A composition containing a fluorinated compound of the present invention is a composition comprising the following fluorinated compound (A), the following compound (B) and a solvent (S1), or a composition comprising the following fluorinated compound (A), the following compound (B) and the following solvent (S2). Hereinafter, the former composition may also be referred to as a "composition (X)", and the latter composition may also be referred to as a "composition (Y)". The fluorinated compound-containing composition of the present invention may contain other components (unreacted raw materials, by-products, additives used in the production of the fluorinated compound-containing composition (hereinafter also referred to as "production additives"), etc.) within a range not to impair the effects of the present invention.

Fluorinated compound (A): a fluorinated compound obtained by reacting a compound (a) having a poly(oxyperfluoroalkylene) chain and an active hydrogen-containing group, a compound (b) having a polymerizable carbon-carbon double bond and an active hydrogen-containing group, and a polyisocyanate (c).

Compound (B): a compound having a polymerizable carbon-carbon double bond and an active hydrogen-containing group.

Solvent (S2): a solvent containing a non-fluorinated solvent or a fluorinated solvent having an active hydrogen-containing group.

The solvent (S1) is a reaction solvent to be used in preparing a fluorinated compound (A), and a solvent presenting high solubility to reaction raw materials such as a compound (a1) and to a fluorinated compound (A) to be formed. Further, the solvent (S1) is required to be a solvent inert to the reaction raw materials. The composition (X) may be a composition to be used for a coating liquid to be described later, or may be a composition to be used for producing a composition (Y) by solvent substitution or the like.

On the other hand, the solvent (S2) is a solvent which dissolves a fluorinated compound (A), but solubility for the compound (a1) and the polyisocyanate (c) may be low. Further, the solvent (S2) is one that is not used as a reaction solvent for producing a fluorinated compound (A), and may be a solvent which can react with the polyisocyanate (c). As the solvent for a coating liquid as described later, the solvent (S2) is preferred in many cases, and therefore, the composition (Y) is used for producing the coating liquid.

[Fluorinated Compound (A)]

The fluorinated compound (A) is a fluorinated compound which is a compound having a portion derived from a compound (a) having a poly(oxyperfluoroalkylene) chain and an active hydrogen-containing group, a portion derived from a compound (b) having a polymerizable carbon-carbon double bond and an active hydrogen-containing group and a portion derived from a polyisocyanate (c), and which has no isocyanate group.

The fluorinated compound (A) is a reaction product obtainable by reacting the compound (a), the compound (b) and the polyisocyanate (c), and is usually a mixture of two or more fluorinated compounds. Depending upon whether the compound (a) or the compound (b) is monofunctional or polyfunctional, or depending upon the manner for letting such three components be reacted, various fluorinated compounds (A) will be formed, and further, the types and amounts of by-products to be formed, such as fluorinated compounds other than the fluorinated compound (A), non-fluorinated compounds, etc. will be different.

In order to suppress formation of undesirable by-products and to reduce the amount of by-products, each of the compound (a) and the compound (b) is preferably a compound having one active hydrogen-containing group per molecule. If either one of the compound (a) and the compound (b) is a compound having two or more active hydrogen-containing groups per molecule, the fluorinated compound (A) tends to become a high molecular weight compound, and if a high molecular weight fluorinated compound (A) is formed, its solvent solubility or compatibility with other components tends to decrease.

On the other hand, the compound (a) is produced from a linear compound having a poly(oxyperfluoroalkylene) chain, and at that time, together with a compound having an active hydrogen-containing group at one end of the poly(oxyperfluoroalkylene) chain, a compound having active hydrogen-containing groups at both ends of the poly(oxyperfluoroalkylene) chain is also likely to be formed. Further, in the case of producing a compound having one active hydrogen-containing group from a compound having two active hydrogen-containing groups, an unreacted compound having two active hydrogen-containing groups is likely to remain in the compound having one active hydrogen-containing group. Here, the compound having one active hydrogen-containing group and a compound having two active hydrogen-containing groups can be separated.

The compound (a) is preferably a compound having one active hydrogen-containing group per molecule, but may contain a small amount of a compound having two active hydrogen-containing groups per molecule. If it comprises a compound having one active hydrogen-containing group and a small amount of a compound having two active hydrogen-containing groups, the proportion of the compound having two active hydrogen-containing groups to the total amount of the compound having one active hydrogen-containing group and the compound having two active hydrogen-containing groups is preferably less than 0.1 mass %.

Hereinafter, unless otherwise specified, the compound (a) is a compound having one active hydrogen-containing group per molecule.

Similarly, hereinafter, unless otherwise stated, the compound (b) is also a compound having one active hydrogen-containing group per molecule. Here, the compound (B) may be a compound having two or more active hydrogen-containing groups per molecule, so long as it does not participate in the production of the fluorinated compound (A).

A polyisocyanate (c) is a compound having at least two isocyanate groups per molecule. When the polyisocyanate (c) is a diisocyanate compound, a by-product having the compound (a) reacted to the two isocyanate groups, or a by-product having the compound (b) reacted to the two isocyanate groups is likely to be formed. Therefore, the polyisocyanate (c) is preferably a compound having an average of from 2.5 to 4 isocyanate groups per molecule, particularly preferably a triisocyanate.

As types of the fluorinated compound obtainable by reacting the compound (a), the compound (b) and the polyisocyanate (c), for example, the following fluorinated compounds (A1) to (A4) may be mentioned.

(A1) A fluorinated compound having a compound (a) having a poly(oxyperfluoroalkylene) chain and one active hydrogen group (hereinafter also referred to as a "compound (a1)") and a compound (b) having a polymerizable carbon-carbon double bond and one active hydrogen group (hereinafter also referred to as a "compound (b1)") reacted to the polyisocyanate (c).

(A2) A fluorinated compound having only the compound (a1) reacted to the polyisocyanate (c).

(A3) A fluorinated compound having only the compound (b1) reacted to the polyisocyanate (c).

(A4) A cross-linked type fluorinated compound in which between two or more polyisocyanates (c), a compound (a) having a poly(oxyperfluoroalkylene) chain and two active hydrogen groups (hereinafter also referred to as a "compound (a2)") is crosslinked and further either one or both of the compound (a1) and the compound (b1) are reacted to an isocyanate group that does not contribute to crosslinking, of each polyisocyanate (c).

As the fluorinated compound (A1), there will be (the number of isocyanate groups in the polyisocyanate (c)—1) types of fluorinated compounds (A1). For example, when the polyisocyanate (c) has three isocyanate groups, there will be two types of fluorinated compounds i.e. a fluorinated compound wherein one compound (a1) and two compounds (b) have reacted to the polyisocyanate (c), and a fluorinated compound wherein two compounds (a1) and one compound (b) have reacted to the polyisocyanate (c).

Further, as the fluorinated compound (A4), there will be an infinite number of types depending on the numbers of all compounds (a2) and polyisocyanates (c) and the combinations of the compound (a1) and the compound (b1) which react to the respective polyisocyanates (c).

For example, in a case where the compound (a) has one hydroxy group and a trifluoromethyl group at one terminal, the compound (b) has one hydroxy group, and the polyisocyanate (c) is a triisocyanate, as shown in the following formulae, the compound (a), compound (b) and the polyisocyanate (c) are reacted to obtain a mixture of fluorinated compounds (A1) to (A3) in which the respective compounds are bonded by urethane bonds.

Here, Ra is a residue obtained by removing the terminal trifluoromethyl group and hydroxy group from the compound (a), Rb is a residue obtained by removing the terminal polymerizable carbon-carbon double bond and hydroxy group from the compound (b), and Rc is a residue obtained by removing the isocyanate groups from the polyisocyanate (c).

(Compound (a))

A compound (a) is a compound having a poly(oxyperfluoroalkylene) chain and an active hydrogen-containing group.

As the compound (a), from the viewpoint of sufficiently imparting antifouling properties to an object (such as a hard coat layer), a compound having a poly(oxyperfluoroalkylene) chain and one active hydrogen-containing group is preferred.

The compound (a1) preferably has a single perfluoroalkyl group from the viewpoint of sufficiently imparting antifouling properties to an object (such as a hard coat layer).

<Poly(oxyperfluoroalkylene) Chain>

A poly(oxyperfluoroalkylene) chain imparts antifouling properties to an object.

As the poly(oxyperfluoroalkylene) chain, from the viewpoint of sufficiently imparting antifouling properties to an object, a chain represented by the following formula is preferred.

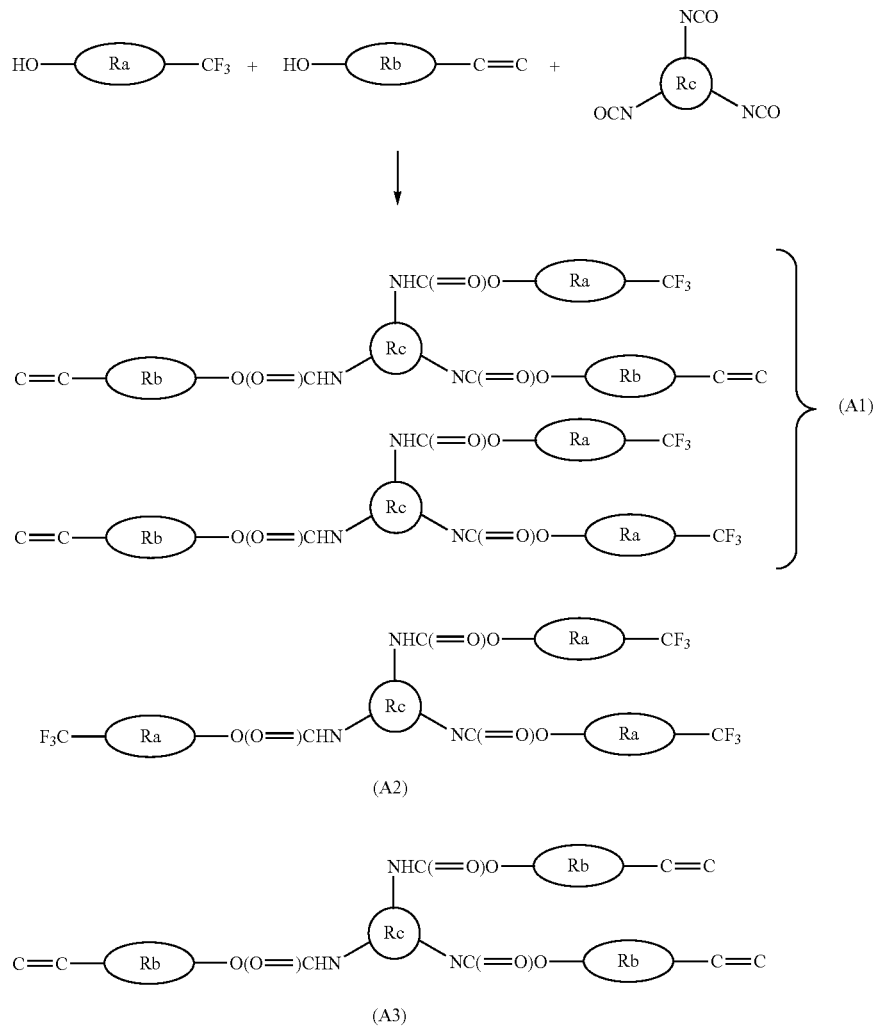

$(C_mF_{2m}O)_n$

Here, m is an integer of from 1 to 6, n is an integer of from 2 to 200, $(C_mF_{2m}O)_n$ may be one composed of at least two types of $C_mF_{2m}O$.

m is, from the viewpoint of sufficiently imparting antifouling properties to an object, preferably an integer of from 1 to 3, particularly preferably 1 or 2.

When m is at least 2, $C_mF_{2m}O$ may be linear or may be branched. From the viewpoint of sufficiently imparting antifouling properties to an object, it is preferably linear.

n is, from the viewpoint of sufficiently imparting antifouling properties to an object, preferably an integer of at least 3, more preferably an integer of at least 4, particularly preferably an integer of at least 5. From such a viewpoint that if the number average molecular weight of the compound (a) is too large, the number of polymerizable carbon-carbon double bonds present per unit molecular weight of the fluorinated compound (A) decreases, and the abrasion resistance of an object decreases, and from such a viewpoint that compatibility between the fluorinated compound (A) and other components in the composition is excellent, n is preferably an integer of at most 100, more preferably an integer of at most 80, particularly preferably an integer of at most 60.

In $(C_mF_{2m}O)_n$, in a case where at least two types of $C_mF_{2m}O$ different in m, are present, the bonding order of the respective $C_mF_{2m}O$ is not limited. For example, in a case where $CF_2O$ and $CF_2CF_2O$ are present, $CF_2O$ and $CF_2CF_2O$ may be randomly arranged or alternatingly arranged, or a block consisting of a plurality of $CF_2O$ and a block consisting of a plurality of $CF_2CF_2O$ may be linked.

$(C_mF_{2m}O)_n$ is, from the viewpoint of sufficiently imparting antifouling properties to an object, preferably $\{(CF_2O)_{n1}(CF_2CF_2O)_{n2}\}$ (wherein n1 is an integer of at least 1, n2 is an integer of at least 1, n1+n2 is an integer of from 2 to 200, and the bonding order of n1 pieces of $CF_2O$ and n2 pieces of $CF_2CF_2O$ is not limited).

$\{(CF_2O)_{n1}(CF_2CF_2O)_{n2}\}$ has excellent mobility, whereby the lubricity of an object will be excellent. Particularly, $(CF_2O)_{n1}$ is superior in mobility, since it is a group having an oxygen atom with the number of carbon atoms being 1.

With respect to $\{(CF_2O)_{n1}(CF_2CF_2O)_{n2}\}$, from the viewpoint of efficiency in producing the compound (a), the terminal on the side bonded to —$CH_2$— of the after-described $D^1$, of is $\{(CF_2O)_{n1}(CF_2CF_2O)_{n2}\}$, preferably $CF_2O$. $\{(CF_2O)_{n1}(CF_2CF_2O)_{n2}\}$, of which the terminal on the side bonded to —$CH_2$—, is $CF_2O$, will be hereinafter represented by $CF_2O\{(CF_2O)_{n1-1}(CF_2CF_2O)_{n2}\}$. Here, also in $CF_2O\{(CF_2O)_{n1-1}(CF_2CF_2O)_{n2}\}$, as described above, the bonding order of (n1-1) pieces of ($CF_2O$) and n2 pieces of ($CF_2CF_2O$) is not limited.

n1 is, from the viewpoint of sufficiently imparting antifouling properties to an object, preferably an integer of at least 2, particularly preferably an integer of at least 3. From such a viewpoint that if the number average molecular weight of the compound (a) is too large, the number of polymerizable carbon-carbon double bonds present per unit molecular weight of the fluorinated compound (A) decreases, and the abrasion resistance of an object decreases, and from the viewpoint of excellent compatibility between the fluorinated compound (A) and other components in the composition, n1 is preferably an integer of at most 50, more preferably an integer of at most 40, particularly preferably an integer of at most 30.

n2 is, from the viewpoint of sufficiently imparting antifouling properties to an object, particularly preferably an integer of at least 2. From such a viewpoint that if the number average molecular weight of the compound (a) is too large, the number of polymerizable carbon-carbon double bonds present per unit molecular weight of the fluorinated compound (A) decreases, and the abrasion resistance of an object decreases, and from the viewpoint of excellent compatibility between the fluorinated compound (A) and other components in the composition, n2 is preferably an integer of at most 50, more preferably an integer of at most 40, particularly preferably an integer of at most 30.

The ratio between n1 and n2 is, from the viewpoint of sufficiently imparting lubricity to an object, preferably such that n2 is from 1 to 3 times of n1.

The compound (a) may be produced as a mixture of a plurality of compounds different in the number of n in $(C_mF_{2m}O)_n$. In such a case, the average value of n as a mixture is preferably from 2 to 100, particularly preferably from 4 to 80. Further, the compound (a) may be produced as a mixture of a plurality of compounds different in the numbers of n1 and n2 in $\{(CF_2O)_{n1}(CF_2CF_2O)_{n2}\}$. In such a case, as a mixture, the average value of n1 is preferably from 1 to 50, and the average value of n2 is preferably from 1 to 50.

<Active Hydrogen-Containing Group>

An active hydrogen-containing group is one to react with an isocyanate group of the polyisocyanate (c) to incorporate the structure of the compound (a) as part of the structure of the fluorinated compound (A).

The active hydrogen-containing group may, for example, be a hydroxy group, a carboxy group, an amino group, etc. From the viewpoint of availability of raw material, a hydroxy group is particularly preferred.

As the compound (a1), from the viewpoint of sufficiently imparting antifouling properties to an object, a compound (1) represented by the following formula (1) is preferred.

$$D\text{-}(C_mF_{2m}O)_n\text{-}E \qquad (1)$$

Here, D is $D^1\text{-}R^f\text{—}O\text{—}CH_2\text{—}$ or $D^2\text{-}O\text{—}$, $D^1$ is $CF_3$— or $CF_3$—O—, $R^f$ is a $C_{1\text{-}20}$ fluoroalkylene group, a $C_{2\text{-}20}$ fluoroalkylene group having an etheric oxygen atom between carbon-carbon atoms, a $C_{1\text{-}20}$ alkylene group, or a $C_{2\text{-}20}$ alkylene group having an etheric oxygen atom between carbon-carbon atoms.

$D^2$ is a $C_{1\text{-}6}$ perfluoroalkyl group, m is an integer of from 1 to 6, n is an integer of from 2 to 200, and $(C_mF_{2m}O)_n$ may be one composed of at least two types of $C_mF_{2m}O$, E is a monovalent organic group having one hydroxy group.

$D^1$ is $CF_3$— or $CF_3$—O—, whereby one terminal of the compound (1) becomes to be $CF_3$—. Thus, the compound (1) is capable of sufficiently imparting antifouling properties to an object.

The number of hydrogen atoms in $R^f$ is preferably at least 1 from the viewpoint of sufficiently imparting lubricity to an object. The number of hydrogen atoms in $R^f$ is at most (the number of carbon atoms in $R^f$)×2, and from the viewpoint of sufficiently imparting antifouling properties to an object, at most (the number of carbon atoms in $R^f$) is preferred. From the viewpoint of sufficiently imparting antifouling properties to an object, $R^f$ preferably contains no hydrogen atom.

When $R^f$ has a hydrogen atom, the above-mentioned mobility of $(C_mF_{2m}O)_n$ is further improved, whereby it is possible to sufficiently impart lubricity to an object, and compatibility between the fluorinated compound (A) and other components in the composition will be excellent. On the other hand, when $R^f$ has no hydrogen atom, it is not possible to sufficiently impart lubricity to an object, compatibility between the fluorinated compound (A) and other components in the composition tends to be insufficient, and storage stability of the composition tends to be insufficient.

As $R^f$, from the viewpoint of efficiency in producing the compound (1), a group represented by the following formula (g1-1), a group represented by the following formula (g1-2) or a group represented by the following formula (g1-3), is preferred. Here, $R^F$ is a group bonded to $D^1$.

$$—R^F—O—CHFCF_2— \quad (g1\text{-}1)$$

$$—R^F—CHFCF_2— \quad (g1\text{-}2)$$

$$—R^F—C_zH_{2z}— \quad (g1\text{-}3)$$

Here, $R^F$ is a single bond, a $C_{1-15}$ perfluoroalkylene group or a $C_{2-15}$ perfluoroalkylene group having an etheric oxygen atom between carbon-carbon atoms, and z is an integer of from 1 to 4.

$R^F$ is, from the viewpoint of sufficiently imparting antifouling properties to an object, preferably a $C_{1-9}$ perfluoroalkylene group or a $C_{2-13}$ perfluoroalkylene group having an etheric oxygen atom between carbon-carbon atoms. The perfluoroalkylene group may be linear or branched.

z is preferably an integer of from 1 to 3. When z is at least 3, $C_zH_{2z}$ may be linear or branched, preferably linear.

As $R^f$, from the viewpoint of efficiency in producing the compound (1), a group represented by the formula (g1-1) is preferred, and as the $D^1$-$R^f$—O—$CH_2$— group, a group represented by the following formula (g2) is preferred.

$$R^{F2}—O—CHFCF_2—O—CH_2— \quad (g2)$$

wherein $R^{F2}$ is a $C_{1-6}$ perfluoroalkyl group with its terminal being $CF_3$.

The group represented by the formula (g2) can be formed by adding a perfluoro (alkyl vinyl ether) represented by $R^{F2}$—O—CF=$CF_2$ to a poly(oxyperfluoroalkylene) chain-containing compound having HO—$CH_2$—.

Specific examples of the group represented by the formula (g2) may be the following groups.

$CF_3O—CHFCF_2—O—CH_2—$,
$CF_3CF_2—O—CHFCF_2—O—CH_2—$,
$CF_3CF_2CF_2—O—CHFCF_2—O—CH_2—$,
$CF_3CF_2CF_2CF_2—O—CHFCF_2O—CH_2—$,
$CF_3CF_2CF_2CF_2CF_2CF_2—O—CHFCF_2—O—CH_2$

A perfluoroalkyl group for $D^2$ may be linear or may be branched.

$D^2$ is, from the viewpoint of sufficiently imparting antifouling properties to an object, preferably a $C_{1-3}$ perfluoroalkyl group, particularly preferably $CF_3$— or $CF_3CF_2$—.

E may be —$R^1$—OH (wherein $R^1$ is a divalent organic group which may have fluorine atom(s)).

$R^1$ is preferably an alkylene group having at most 10 carbon atoms, or a fluoroalkylene group having at most 10 carbon atoms with the —OH side terminal being a methylene group.

E is preferably —$CF_2CH_2$—OH, —$CF_2CF_2CH_2$—OH or —$CF_2CF_2CF_2CH_2$—OH.

Specific examples of the compound (1) may, for example, be the following.

$$CF_3CF_2—O—(CF_2CF_2CF_2O)_{n10}—CF_2CF_2CH_2—OH \quad (11)$$

$$CF_3—CF_2CF_2—O—CHFCF_2—O—CH_2—CF_2O\{(CF_2O)_{n11\text{-}1}(CF_2CF_2O)_{n12}\}—CF_2CH_2—OH \quad (12)$$

$$CF_3—O—\{(CF_2O)_{n11}(CF_2CF_2O)_{n12}\}—CF_2CH_2—OH \quad (13)$$

$$CF_3—O—[(CF_2CF_2O—CF_2CF_2CF_2CF_2O)_{n13}—CF_2CF_2O]—CF_2CF_2CF_2CH_2—OH \quad (14)$$

$$CF_3—O—(CF_2CF_2O)_{n10}—CF_2CH_2—OH \quad (15)$$

Here, n10 is an integer of from 2 to 200, n11 is an integer of at least 1, n12 is an integer of at least 0, n11+n12 is an integer of from 2 to 200, the bonding order of n11 pieces of $CF_2O$ and n12 pieces of $CF_2CF_2O$ is not limited, and n13×2+1 is an integer of from 3 to 200.

<Number Average Molecular Weight of Compound (a)>

The number average molecular weight of the compound (a) is preferably from 1,000 to 6,000, more preferably from 1,000 to 5,000, particularly preferably from 1,200 to 4,000. When the number average molecular weight of the compound (a) is within such a range, it is possible to sufficiently impart antifouling properties to an object, and at the same time, the compound (a) will be excellent in compatibility with other components in the composition.

The number average molecular weight of the compound (a) can be obtained by comparison with the flow time of polymethyl methacrylate by gel permeation chromatography (GPC), or by comparing the integral ratio of terminal functional groups of the compound (a) to the internal standard substance by nuclear magnetic resonance apparatus (NMR).

(Method for Producing Compound (a))

As a method for producing the compound (a), in a case where the active hydrogen-containing group is a hydroxy group, the following method (1) or method (2) may, for example, be mentioned.

(1) A method of contacting fluorine gas to a compound having a poly(oxyperfluoroalkylene) chain and two carboxy groups to fluorinate part of the carboxy groups, followed by reducing the remaining carboxy groups (see JP-A-2011-116947). As the compound having a poly(oxyperfluoroalkylene) chain and two carboxy groups, a commercially available compound may be used.

(2) A method of reacting a compound having a poly(oxyperfluoroalkylene) chain and two hydroxy groups and a perfluoro(alkyl vinyl ether), to add perfluorovinyl groups to part of the hydroxy groups. As the compound having a poly(oxyperfluoroalkylene) chain and two hydroxy groups, a commercially available compound may be used. The commercially available compound may, for example, be "FLUOROLINK D" (trade name), "Fomblin Z-Dol" (trade name), etc.

In the above two methods, it is not uncommon that a compound having two hydroxy groups will be formed or will remain unreacted, and therefore, it is preferred to remove such a compound having two hydroxy groups. However, if the content of the compound having two hydroxy groups is small, a mixture containing the content of the compound having two hydroxy groups as a compound (a) may be used as the compound (a).

<Method (1)>

A specific example of the method (1) will be described blow.

Compound (53-1) is contacted with fluorine gas to obtain a mixture (d) comprising compound (43-1), unreacted compound (53-1) and compound (33-1).

$$CF_3—O—\{(CF_2O)_p(CF_2CF_2O)_q\}—CF_2C(=O)OH \quad (43\text{-}1)$$

$$HO—C(=O)—CF_2O\{(CF_2O)_p(CF_2CF_2O)_q\}—CF_2C(=O)—OH \quad (53\text{-}1)$$

$$CF_3—O—\{(CF_2O)_p(CF_2CF_2O)_q\}—CF_3 \quad (33\text{-}1)$$

Here, p is an integer of at least 1, q is an integer of at least 0, p+q+1 is an integer of from 3 to 200, and the bonding order of p pieces of $CF_2O$ and q pieces of $CF_2CF_2O$ is not limited.

The mixture (d) is treated with a reducing agent (sodium bis(2-methoxyethoxy) aluminum hydride, etc.), to obtain a mixture comprising compound (13-1), compound (23-1) and unreacted compound (33-1).

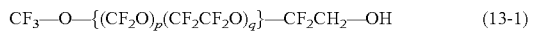  (13-1)

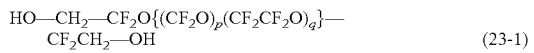  (23-1)

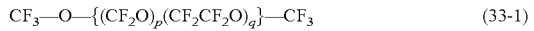  (33-1)

<Method (2)>

A specific example of the method (2) will be described below.

Compound (23-1) and perfluoro(n-propyl vinyl ether) ($CF_3CF_2CF_2$—O—CF=$CF_2$) are reacted to obtain a mixture comprising compound (12-1), unreacted compound (23-1) and compound (32-1).

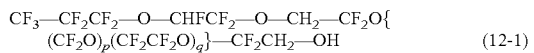  (12-1)

  (23-1)

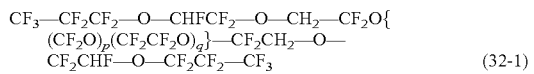  (32-1)

<Unreacted Raw Materials, and by-Products>

In a case where the desired compound (a) is a compound (a1), in the method (1), a compound (a2), and a compound (e1) having a poly(oxyperfluoroalkylene) chain and two perfluoroalkyl groups and having no active hydrogen-containing group may be formed as by-products.

In a case where the desired compound (a) is a compound (a1), in the method (2), an unreacted compound (a2) may remain. Further, a compound (e1) may be formed as a by-product.

The compound (a2) may be included in the compound (a) obtained by the method (1) or method (2), may be included in the fluorinated compound-containing composition produced by using the compound (a), may be included in the coating liquid and the hard coat layer-forming composition prepared by using the fluorinated compound-containing composition, and may be included in the hard coat layer formed from the hard coat layer-forming composition. However, the compound (e1) has low compatibility with other components, and therefore, if the compound (e1) remains in a composition, the composition becomes cloudy. Therefore, if the mixture obtained by the method (1) or method (2) contains a compound (e1), the compound (e1) may be removed by purification.

Specific examples of the compound (a2) may, for example, be the following.

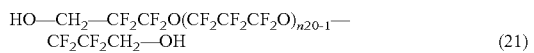  (21)

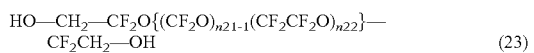  (23)

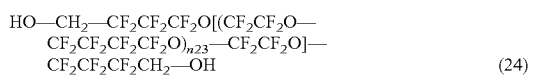  (24)

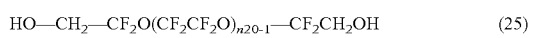  (25)

Here, n20 is an integer of from 2 to 200, n21 is an integer of at least 1, n22 is an integer of at least 0, n21+n22 is an integer of from 2 to 200, the bonding order of n21 pieces of $CF_2O$ and n22 pieces of $CF_2CF_2O$ is not limited, and n23×2+2 is an integer of from 4 to 200.

Specific examples of the compound (e1) may, for example, be the following.

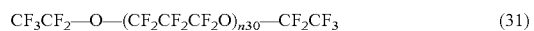  (31)

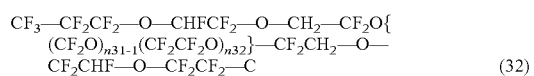  (32)

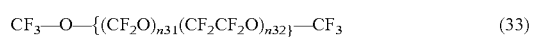  (33)

  (35)

Here, n30 is an integer of from 2 to 200, n31 is an integer of at least 1, n32 is an integer of at least 0, n31+n32 is an integer of from 2 to 200, and the bonding order of n31 pieces of $CF_2O$ and n32 pieces of $CF_2CF_2O$ is not limited.

(Compound (b))

A compound (b) is a compound having a polymerizable carbon-carbon double bond and an active hydrogen-containing group.

<Polymerizable Carbon-Carbon Double Bond>

A polymerizable carbon-carbon double bond will react with the after-described photopolymerizable compound contained in the composition, by light irradiation, to impart abrasion resistance to an object (such as a hard coat layer).

The polymerizable carbon-carbon double bond may, for example, be a (meth) acryloyl group, a vinyl group, an allyl group, a styryl group, a maleimide group, etc. From the viewpoint of sufficiently imparting abrasion resistance to an object, a (meth) acryloyl group is preferred, and an acryloyl group is particularly preferred.

The number of the polymerizable carbon-carbon double bonds is preferably from 1 to 8, more preferably from 1 to 4, particularly preferably 1, per molecule of the compound (b).

An active hydrogen-containing group will react with an isocyanate group of the polyisocyanate (c), to incorporate the structure of the compound (b) as part of the structure of the fluorinated compound (A).

The active hydrogen-containing group may be the same as the active hydrogen-containing group in the compound (a), and preferred embodiments may also be the same.

The number of active hydrogen-containing groups is preferably 1 per molecule of the compound (b).

The compound (b) may, for example, be a hydroxyalkyl (meth)acrylate, a polyoxyalkylene glycol mono(meth)acrylate, etc. As the compound (b), a hydroxyalkyl (meth) acrylate having a number of carbon atoms in the hydroxyalkyl group being from 2 to 10, is preferred, and a hydroxyalkyl acrylate having a linear hydroxyalkyl group with a hydroxy group at the terminal, is particularly preferred.

Specific examples of the compound (b) may, for example, be the following.

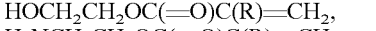
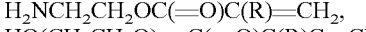
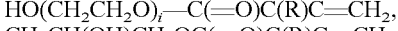
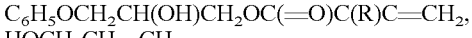
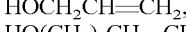
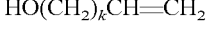

$(CH_3)_3SiCH(OH)CH=CH_2$,
$HOC_6H_4CH=CHC_6H_5$.

Here, R is a hydrogen atom or a methyl group, i is an integer from 2 to 10, and k is an integer of from 2 to 20.
(Polyisocyanate (c))

A polyisocyanate (c) is a compound having at least two isocyanate groups.

<Isocyanate Group>

The isocyanate group is one to react with an active hydrogen-containing group of the compound (a) or with an active hydrogen-containing group of the compound (b), to incorporate the structure of the polyisocyanate (c) as part of the structure of the fluorinated compound (A).

The number of isocyanate groups is preferably from 2.5 to 4, particularly preferably 3, on average per molecule.

<Preferred Polyisocyanate (c)>

The polyisocyanate (c) may, for example, be a diisocyanate such as hexamethylene diisocyanate, isophorone diisocyanate, 4,4'-dicyclohexylmethane diisocyanate, tolylene diisocyanate, 4,4'-diphenylmethane diisocyanate, xylylene diisocyanate, etc., or a triisocyanate or tetraisocyanate as a modified product of such a diisocyanate.

Specific examples of the triisocyanate may, for example, be the following.

An isocyanurate-modified alkylene diisocyanate represented by the following formula (6-1) (cyclic trimer of alkylene diisocyanate), An isocyanurate-modified tolylene diisocyanate represented by the following formula (6-2) (cyclic trimer of tolylene diisocyanate), An isocyanurate-modified isophorone diisocyanate represented by the following formula (6-3) (cyclic trimer of isophorone diisocyanate), A biuret modified alkylene diisocyanate represented by the following formula (6-4), A glycerol-modified alkylene diisocyanate represented by the following formula (6-5).

Here, s, t and u are each independently an integer of from 2 to 10.

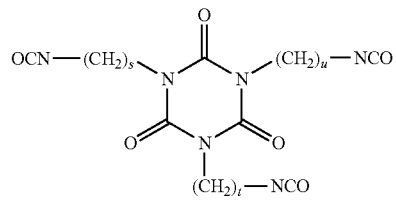
(6-1)

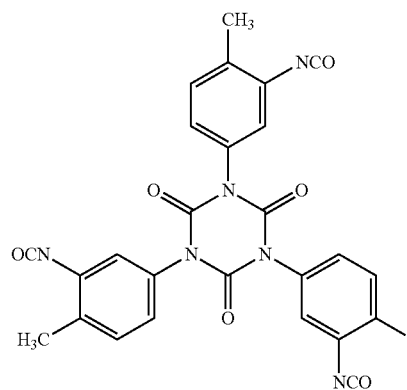
(6-2)

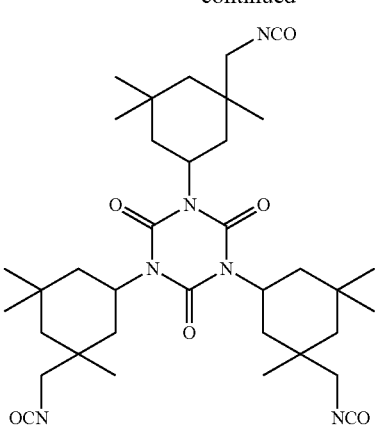
(6-3)

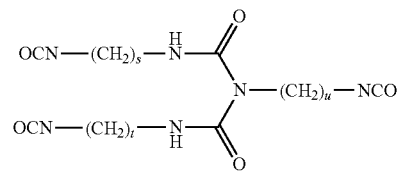
(6-4)

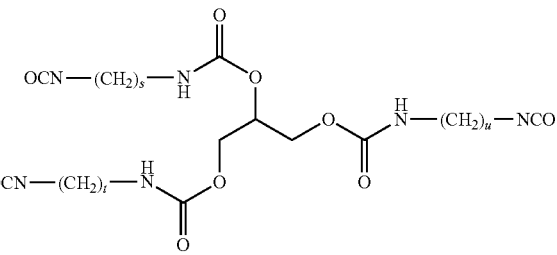
(6-5)

(Number Average Molecular Weight of Fluorinated Compound (A))

The number average molecular weight of the fluorinated compound (A) is preferably from 1,200 to 8,000, more preferably from 1,200 to 7,000, particularly preferably from 1,200 to 5,000. When the number average molecular weight is within said range, it is possible to sufficiently impart antifouling properties to an object (such as a hard coat layer), and compatibility between the fluorinated compound (A) and other components in the composition will be excellent.

The number average molecular weight of the fluorinated compound (A) is the number average molecular weight as calculated as polymethyl methacrylate, obtained by gel permeation chromatography (GPC).

[Compound (B)]

The compound (B) is a compound having a polymerizable carbon-carbon double bond and an active hydrogen-containing group. The active hydrogen-containing group is preferably a hydroxy group from the viewpoint of excellent defoaming effects.

The compound (B) is specifically a compound (b), a compound having a polymerizable carbon-carbon double bond and an active hydrogen-containing group other than the compound (b), or a mixture thereof.

That is, the compound (B) may be a compound (b) used in producing a fluorinated compound-containing composition of the present invention and remaining as unreacted in the fluorinated compound-containing composition of the present invention, or may be a compound added after obtaining the fluorinated compound (A) by reacting a compound (a), a compound (b) and a polyisocyanate (c).

The compound (B) added after obtaining the fluorinated compound (A) may, for example, be a compound selected as a compound (b) in the production of the fluorinated compound (A) or a compound exemplified as the above-mentioned compound (b) other than that.

In the fluorinated compound (A), by using the compound (b) in excess, a reaction product containing unreacted compound (b) will be obtained. Therefore, in the compositions of the present invention, at least part of the compound (B) is the compound (b) used for the production of the fluorinated compound (A).

[Solvent (S1)]

The solvent (S1) is not particularly limited, so long as it is a solvent which is inert in the production of the fluorinated compound (A) and capable of dissolving raw material compounds, and which is capable of dissolving the fluorinated compound (A) and the compound (B).

The solvent (S1) is a reaction solvent used in producing the fluorinated compound-containing composition of the present invention, and it may be part or all of the following coating solvent.

As the solvent (S1), a solvent having high solubility for any of raw material compounds such as a compound (a) and an obtainable fluorinated compound (A), is preferred. Further, it is a solvent inert in the production of the fluorinated compound (A), as mentioned above. For example, it is a solvent having no active hydrogen-containing group. As the solvent (S1), a fluorinated organic solvent is preferred, and for example, a fluoroalkane, a hydrochlorofluoroalkane, a chlorofluoroalkane, a fluoro aromatic compound or a fluoroalkyl ether may be mentioned. As the solvent (S1), a chlorofluoroalkane or a fluoroalkyl ether is preferred.

In particular, if a solvent having high solubility of the compound (a) is used as the solvent (S1), it is not rare to use a solvent different from the following coating solvent. In such a case, the solvent (S1) in the composition (X) of the present invention will be substituted by the following coating solvent, to obtain the composition (Y) of the present invention, which will be used for the production of the coating liquid.

[Coating Solvent]

The solvent in the coating liquid is preferably a solvent suitable for coating (hereinafter referred to as a "coating solvent"). As the coating solvent, an organic solvent having a boiling point suitable for the application method, is preferred, and an organic solvent having a boiling point of at most 80° C. is more preferred.

The organic solvent may be a fluorinated organic solvent or a non-fluorinated organic solvent, or may contain both solvents.

The fluorinated organic solvent may, for example, be a fluoroalkane, a fluoro aromatic compound, a fluoroalkyl ether, a fluoroalkyl amine, a fluoroalkyl alcohol, etc.

As the fluorinated organic solvent, with a view to easily dissolving the fluorinated compound (A), a fluoroalkane, a fluoro aromatic compound, a fluoroalcohol or a fluoroalkyl ether is preferred, and a fluoroalcohol or a fluoroalkyl ether is particularly preferred.

The non-fluorinated organic solvent is preferably a compound consisting solely of hydrogen atoms and carbon atoms, or a compound consisting solely of hydrogen atoms, carbon atoms and oxygen atoms, and a hydrocarbon-type organic solvent, an alcohol-type organic solvent, a ketone-type organic solvent, an ether-type organic solvent, a glycol ether-type organic solvent, an ester-type organic solvent, etc. may be mentioned.

As the non-fluorinated organic solvent, with a view to easily dissolving the fluorinated compound (A), a glycol ether-type organic solvent or a ketone-type organic solvent is particularly preferred.

The coating solvent is preferably at least one organic solvent selected from the group consisting of a fluoroalkane, a fluoro aromatic compound, a fluoroalkyl ether, a fluoroalcohol, a compound consisting solely of hydrogen atoms and carbon atoms, and a compound consisting solely of hydrogen atoms, carbon atoms and oxygen atoms, particularly preferably a fluorinated organic solvent selected from a fluoroalkane, a fluoro aromatic compound, a fluoroalkyl ether and a fluoroalcohol.

As the coating solvent, with a view to increasing the solubility of the fluorinated compound (A), preferred is one containing at least one organic solvent selected from the group consisting of a fluoroalkane, a fluoro aromatic compound, a fluoroalkyl ether, a fluoroalcohol, and a compound consisting solely of hydrogen atoms, carbon atoms and oxygen atoms, in total of at least 90 mass % of the entire coating solvent.

The coating solvent may be the solvent (S1) or the solvent (S2), or may be one other than these solvents. The solvent (S2) is preferred as the coating solvent.

The solvent (S2) is a solvent containing a non-fluorinated organic solvent having a low solubility of raw material compounds such as the compound (a), or a fluorinated organic solvent having an active hydrogen-containing group that can not be used as the above-mentioned reaction solvent. The non-fluorinated solvent may be a non-fluorinated solvent having an active hydrogen-containing group.

As the fluorinated solvent having an active hydrogen-containing group, a fluoroalcohol may be mentioned. As the non-fluorinated solvent having an active hydrogen-containing group, a non-fluorinated organic solvent containing a hydroxy group, such as an alkylene glycol monoalkyl ether, may be mentioned.

[Composition of Fluorinated Compound-Containing Composition]

The content of the fluorinated compound (A) in the composition (X) or the composition (Y), is from 5 to 30 mass %, preferably from 5 to 25 mass %, particularly preferably from 10 to 20 mass %, in the composition (100 mass %). When the content of the fluorinated compound (A) is at least the lower limit value in the above range, it is possible to suppress the amount of the solvent (S1) to be used for producing the composition (X), and it is possible to reduce labor and energy at the time of replacing the solvent (S1) to the coating solvent. Further, in the case of the composition (Y), it is possible to reduce the volume at the time of shipment of the composition (Y). When the content of the fluorinated compound (A) is at most the upper limit value in the above range, solubility of the fluorinated compound (A) to the composition (X) or the composition (Y) will be excellent.

The content of the compound (B) in the composition (X) or the composition (Y), is from 0.1 to 2 mass %, preferably from 0.1 to 1.5 mass %, particularly preferably from 0.5 to 1.1 mass %, in the composition (100 mass %). When the content of the compound (B) is at least the lower limit value in the above range, it is possible to prevent foaming of the composition (X) and composition (Y) by the defoaming effect due to the compound (B) having an active hydrogen-containing group with high polarity. When the content of the compound (B) is at most the upper limit value in the above range, the amount of the compound (B) having low compatibility with the fluorinated compound (A) is suppressed, whereby solubility of the fluorinated compound (A) to the composition (X) or the composition (Y) will be excellent.

The content of the solvent (S1) in the composition (X) or the content of the solvent (S2) in the composition (Y), is preferably from 68.9 to 94.9 mass %, more preferably from 75 to 90 mass %, particularly preferably from 80 to 90 mass %, in the composition (100 mass %).

The composition (X) or the composition (Y) may contain impurities, such as by-products (compound (e1), etc.) formed during the production of the fluorinated compound-containing composition, unreacted raw materials (compound (a), compound (b), etc.), the production additives (polymerization inhibitor, etc.) used in the production of the fluorinated compound (A), etc.

Among the impurities, the compound (a) and the compound (e1) have low compatibility with other components, whereby, if the compound (a) and the compound (e1) remain in the composition, the composition becomes cloudy. Therefore, the total content of the compound (a) and the compound (e1) is preferably at most 1 mass %, particularly preferably at most 0.5 mass %, in the composition (100 mass %).

Among the impurities, the polyisocyanate (c) has high reactivity with other components, whereby if the polyisocyanate (c) remains in the composition, the storage stability of the composition will be lowered. Therefore, the content of the polyisocyanate (c) is required to be substantially zero. Further, it is preferred that the content of a compound containing an isocyanate group such as an isocyanate group-containing intermediate is also substantially zero.

Identification and quantification of the impurities are carried out by $^1$H-NMR and $^{19}$F-NMR or gas chromatography.

[Method for Producing Fluorinated Compound-Containing Composition]

The composition (X) of the present invention can be produced by the following method.

A method for the production by reacting the compound (a), the compound (b) and the polyisocyanate (c) in the solvent (S1), wherein the amount of the polyisocyanate (c) to be used is at least equal in chemical equivalent to the compound (a) and less than equal in chemical equivalent to the total in chemical equivalent of the compound (a) and the compound (b), and if necessary, after completion of the reaction, the compound (B) may be added, and by adjusting the amount of the solvent (S1) and adjusting the total amount of an unreacted compound (b) and the optionally added compound (B), the contents of the fluorinated compound (A) and the compound (B) are adjusted to be within the above ranges of the contents.

In the above production method, it is also possible to carry out the reaction by letting a catalyst to accelerate the reaction of an isocyanate group and an active hydrogen-containing group, or a polymerization inhibitor to suppress the reaction of a polymerizable carbon-carbon double bond, be present in the reaction system. As the catalyst, a urethanization catalyst such as dibutyltin dilaurate or trimethylamine may be mentioned.

In the above production method for the composition (X), the compound (a), the compound (b) and the polyisocyanate (c) are reacted to form the fluorinated compound (A), and an excess compound (b) will remain unreacted in the reaction system containing the solvent (S1). In a case where the amount of the compound (b) remaining unreacted is less than 0.1 mass % to the composition of the system, after completion of the reaction, the compound (B) is added to bring the content to be at least 0.1 mass %. Here, the compound (B) added after the completion of the reaction may be the compound (b) used as a raw material, or may be any other compound (B). On the other hand, in a case where the amount of compound (b) remaining unreacted exceeds 2 mass % to the composition of the system, the reaction solvent is added for dilution, to bring the amount of the compound (b) to be at most 2 mass %. More preferably, by adjusting the amount of the compound (b) to be used, the amount of compound (b) remaining unreacted, is brought to be from 0.1 to 2 mass %.

In the above production method, by adjusting the amounts of raw material compounds in the solvent (S1), it is possible to bring the content of the fluorinated compound to be formed, to be from 5 to 30 mass %.

As the above production method for the composition (X), preferred is a method wherein the compound (a) and an excess equivalent amount of the polyisocyanate (c) are reacted in the solvent (S1) to produce a reaction intermediate having an isocyanate group, and then to the reaction intermediate, the compound (b) in an amount exceeding the equivalent amount is added to the reaction system, to let the compound (b) be reacted to the reaction intermediate. In this way, it is possible to produce a composition (X) containing less amounts of by-products or unreacted raw materials other than the compound (b).

The composition (Y) of the present invention may be produced by replacing the solvent (S1) of the composition (X) to a coating solvent. As the coating solvent, the solvent (S2) is preferred.

As a method for replacing the solvent (S1) to the coating solvent, a method may be mentioned wherein after distilling off the solvent (S1) from the composition (X), the coating solvent is added. Part of the solvent (S1) may be distilled off, and a solvent other than the solvent (S1) (e.g. the solvent (S2)) may be added, so that the mixed solvent of the solvent (S1) and the solvent other than the solvent (S1), may be used as the coating solvent.

As the distillation method, a known method such as distillation may be mentioned.

Advantageous Effects

In the above-described composition (X) and composition (Y), and method for their production according to the present invention, a fluorinated compound (A) is obtained by reacting the compound (a), the compound (b) and the polyisocyanate (c), whereby due to the structure derived from the compound (a) (especially the terminal $CF_3$—), the surface energy at the surface of an object (such as a hard coat layer) decreases. As a result, it is possible to impart anti-fouling properties to the object.

Further, since the compound (B) is incorporated in an amount of at most 0.1 mass %, it is possible to suppress foaming of the composition by the defoaming effect due to the compound (B) having an active hydrogen-containing group with high polarity.

[Coating Liquid]

The coating liquid of the present invention comprises the fluorinated compound-containing composition, a photopolymerizable compound (excluding the fluorinated compound (A) and the compound (B)) and a photopolymerization initiator. The coating liquid of the present invention may further optionally contain coating liquid additives.

The composition of the coating liquid is not limited to the composition of the composition (X) or the composition (Y). For example, it is possible to reduce the concentration of the fluorinated compound (A) and the compound (B) by further adding a coating solvent to the composition (X) or the composition (Y).

(Photopolymerizable Compound)

A photopolymerizable compound is a monomer to initiate a polymerization reaction by irradiation with light in the presence of a photopolymerization initiator as described later.

The photopolymerizable compound may, for example, be a polyfunctional monomer or a monofunctional monomer. From the viewpoint of imparting abrasion resistance to an object (such as a hard coat layer), one containing a polyfunctional monomer as an essential component is preferred.

As the photopolymerizable compound, one type may be used alone, or two or more types may be used in combination.

The polyfunctional monomer may be a compound having at least two (meth)acryloyl groups per molecule. The number of (meth)acryloyl groups is preferably at least 3, particularly preferably from 3 to 30, per molecule of the polyfunctional monomer.

The polyfunctional monomer is, from the viewpoint of imparting sufficient abrasion resistance to an object, preferably a monomer having at least three (meth)acryloyl groups, wherein the molecular weight per one (meth)acryloyl group is at most 120, or a monomer having a urethane bond and at least three (meth)acryloyl groups.

The polyfunctional monomer may, for example, be a reaction product of a polyol (such as trimethylolpropane, glycerol, pentaerythritol or a multimer thereof) and (meth) acrylic acid, a reaction product of tris(2-acryloyloxyethyl) isocyanurate, a polyol, a polyisocyanate and a hydroxyalkyl (meth)acrylate, or a reaction product of a monofunctional monomer having a hydroxy group and a polyisocyanate.

(Photopolymerization Initiator)

The photopolymerization initiator may be known photopolymerization initiators, for example, aryl ketone photopolymerization initiators (such as acetophenones, benzophenones, alkylamino benzophenones, benzyls, benzoins, benzoin ethers, benzyl dim ethyl ketals, benzoyl benzoates, α-acyl oxime esters, etc.), sulfur-containing photopolymerization initiators (such as sulfides, thioxanthones, etc.), acyl phosphine oxides (such as acyl diaryl phosphine oxides, etc.), and other optical polymerization initiators.

As the photopolymerization initiator, one type may be used alone, or two or more types may be used in combination.

The photopolymerization initiator may be used in combination with a photosensitizer such as an amine.

(Additives for Coating Liquid)

Additives for coating liquid may, for example, be colloidal silica, a photosensitizer, a UV absorber, a light stabilizer, a heat curing stabilizer, an antioxidant, a leveling agent, an antifoaming agent, a thickener, an anti-settling agent, a pigment, a dye, a dispersing agent, an antistatic agent, a surfactant (an anti-fogging agent, a leveling agent, etc.), metal oxide particles, various resins (an epoxy resin, an unsaturated polyester resin, a polyurethane resin, etc.), etc.

(Composition of Coating Liquid)

The content of the fluorinated compound (A) is preferably from 0.01 to 5 mass %, more preferably from 0.02 to 4 mass %, particularly preferably from 0.05 to 3 mass %, in the coating liquid (excluding the solvent) (100 mass %). When the content of the fluorinated compound (A) is within the above range, the storage stability of the coating liquid, and the appearance, abrasion resistance and antifouling properties of an object (such as a hard coat layer) will be excellent.

The content of the photopolymerizable compound is preferably from 20 to 98.99 mass %, more preferably from 50 to 98.99 mass %, further preferably from 60 to 98.99 mass %, particularly preferably from 80 to 98.99 mass %, in the coating liquid (excluding the solvent) (100 mass %). When the content of the photopolymerizable compound is within the above range, the storage stability of the coating liquid, and the appearance, abrasion resistance and antifouling properties of an object will be excellent.

The content of the photopolymerization initiator is preferably from 1 to 15 mass %, more preferably from 3 to 15 mass %, particularly preferably from 3 to 10 mass %, in the coating liquid (excluding the solvent) (100 mass %). When the content of the photopolymerization initiator is within the above range, compatibility with the photopolymerizable compound will be excellent. Further, curability of a coating film to be formed from the coating liquid will be excellent, and a cured film to be formed will be excellent in hardness.

In the case of incorporating additives for coating liquid, the content of the additives for coating liquid is preferably from 0.5 to 20 mass %, more preferably from 1 to 15 mass %, particularly preferably from 1 to 10 mass %, in the coating liquid (excluding the solvent) (100 mass %).

The coating liquid of the present invention contains the solvent (S1) and the solvent (S2) contained in the composition (X) and the composition (Y). By further adding these solvents, the coating liquid may be diluted.

The content of the coating solvent in the coating liquid is preferably from 5 to 80 mass %, more preferably from 10 to 70 mass %, particularly preferably from 20 to 60 mass %, in the coating liquid (100 mass %).

The total content of the compound (a) and the compound (e1) is preferably at most 1 mass %, particularly preferably at most 0.5 mass %, in the coating liquid (100 mass %).

[Hard Coat Layer-Forming Composition]

The hard coat layer-forming composition of the present invention is made of the coating liquid of the present invention.

The coating liquid of the present invention requires no heating at the time of curing a coating film formed therefrom, and thus is suitably used at the time of forming a hard coat layer, on a substrate made of a resin having low heat resistance as compared to e.g. glass.

Advantageous Effects

By the coating liquid and the hard coat layer-forming composition of the present invention as described above, since they contain the fluorinated compound (A), it is possible to form an object (such as a hard coat layer) excellent in antifouling properties.

[Article]

The article of the present invention comprises a substrate and a hard coat layer formed from the hard coat layer-forming composition of the present invention.

(Hard Coat Layer)

The hard coat layer may be formed directly on at least one surface of the substrate, or may be formed via a primer layer as described below on at least one surface of the substrate.

The thickness of the hard coat layer is preferably from 0.5 to 20 μm, particularly preferably from 1 to 15 μm, from the viewpoint of abrasion resistance and antifouling properties.

(Substrate)

The substrate is a member constituting the main body portion of a various article (such as an optical lens, a display, an optical recording medium, etc.) or the surface of such an article, which is required to have abrasion resistance and antifouling properties.

As the material of the surface of the substrate, a metal, a resin, glass, ceramics, stone, or a composite material thereof, may be mentioned. As the material of the surface of the substrate in an optical lens, a display or an optical recording medium, a glass or transparent resin substrate is preferred.

(Primer Layer)

The article of the present invention may further have a primer layer between the substrate and the hard coat layer, from the viewpoint of improving the adhesion between the substrate and the hard coat layer.

The primer layer may be a known one. The primer layer may be formed, for example, by applying a primer layer-forming composition containing a solvent on the surface of the substrate, followed by evaporating off the solvent.

(Applications of Article)

The article of the present invention is suitable as a member to constitute a touch panel. The touch panel is an input device of an input/display device (touch panel device) having a display device and a device to input a contact position information by contact with a finger or the like, combined. The touch panel is composed of a substrate, an input detecting means, etc. The input detecting means is composed of, for example, a transparent conductive film, electrodes, wirings, IC, etc. By setting the surface having the hard coat layer of the article as the input surface of the touch panel, it is possible to obtain a touch panel excellent in antifouling properties and abrasion resistance.

(Method for Producing Article)

The article may be produced, for example, via the following step (I) and step (II).

Step (I): If necessary, a step of forming a primer layer by applying a primer layer-form ing composition on the surface of a substrate.

Step (II): A step of applying a hard coat layer-forming composition on the surface of the substrate or primer layer to obtain a coating film, then removing the coating solvent, followed by photo-curing to form a hard coat layer.

Advantageous Effects

The article of the present invention as described above, has a hard coat layer formed from the hard coat layer-forming composition, whereby it is excellent in antifouling properties.

EXAMPLES

The following describes Example according to the present invention and Comparative Examples. However, the present invention is not limited only to Example.

Ex. 1 is Example of the present invention, and Ex. 2 and 3 are Comparative Examples.

Abbreviations

AC-2000: $C_6F_{13}H$ (ASAHIKLIN (registered trademark) AC-2000, manufactured by Asahi Glass Company, Limited), AE-3000: $CF_3CH_2OCF_2CF_2H$ (ASAHIKLIN (registered trademark) AE-3000, manufactured by Asahi Glass Company, Limited)

L: liters,

Mn: number-average molecular weight.

[Measurements and Evaluations]

(Mn of Compound (a))

The number average molecular weight of the compound (a) was obtained by comparing the integral ratio of terminal functional groups of the internal standard substance and the compound (a) by a nuclear magnetic resonance apparatus (NMR).

(Compatibility)

In accordance with the following standards, the appearance of a hard coat layer-forming composition immediately after preparation was visually evaluated.

○ (good): The solution is uniform with no turbidity.

Δ (acceptable): Slightly turbidity is observed.

x (poor): Turbidity is clearly observed with the naked eye.

(Storage Stability)

A hard coat layer-forming composition was left to stand at room temperature for 3 months, whereupon the appearance of the hard coat layer-forming composition was visually evaluated.

○ (good): The solution is uniform with no turbidity.

Δ (acceptable): Slightly turbidity is observed.

x (poor): Turbidity is clearly observed with the naked eye.

(Appearance of Hard Coat Layer)

In accordance with the following standards, the appearance of the hard coat layer was visually evaluated.

○ (good): No foreign matter is observed, and the film thickness is uniform.

Δ (acceptable): No foreign matter is observed, but there is unevenness in the film thickness.

x (bad): Foreign matter is observed, and there is unevenness in the film thickness.

(Fingerprint Stain Removability)

An artificial fingerprint liquid (liquid consisting of oleic acid and squalene) was deposited on a flat surface of a silicon rubber plug, and excess oil was wiped off by a nonwoven fabric (BEMCOT (registered trademark) M-3, manufactured by Asahi Kasei Corporation), to prepare a stamp for fingerprint. The fingerprint stamp was placed on an article having a hard coat layer, and pressed under a load of 9.8 N for 10 seconds. With respect to the portion where the fingerprint was adhered, wiping was carried out under a load of 4.9N by using a reciprocating traverse testing machine (manufactured by KNT Co.) having tissue paper attached. By visually observing the haze for every one reciprocation for wiping, evaluation was carried out by visually observing the haze until after 10 reciprocations. The evaluation standards are as follows.

○ (good): No haze is visually observed.

Δ (acceptable): The haze is slightly visually observed.

x (poor): The haze is clearly visually observed.

(Oily Ink Repellency)

Evaluation was carried out by drawing a line by a felt pen (McKee thick black, manufactured by ZEBRA CO., LTD.) on the surface of a hard coat layer and visually observing the state of adhesion of oily ink. The evaluation standards are as follows.

⊙ (excellent): Oily ink is repelled in a ball shape.

○ (good): Oily ink is not repelled in a ball shape, but repelled in a linear line, and the line width is less than 50% of the pen tip width of the felt pen.

Δ (acceptable): Oily ink is not repelled in a ball shape, but repelled in a linear line, and the line width is at least 50% and less than 100% of the pen tip width of the felt pen.

x (bad): Oily ink is not repelled in a ball shape or in a linear line, and a clean line is drawn on the surface.

(Abrasion Resistance)

With respect to an article having a hard coat layer, by means of a reciprocating traverse testing machine (manufactured by KNT Co., Ltd.), steel wool (Bonstar (registered trademark) #0000, manufactured by Nippon Steel Wool Co.) was reciprocated 100 times under a load of 9.8N, whereupon in accordance with JIS R3257; 1999, "Wettability test method for a substrate glass surface", the water contact angle and the oleic acid contact angle were measured under conditions of a droplet of about 2 μL/drop at a temperature of 20° C. Each contact angle was measured at three points, and an average value thereof was adopted. The evaluation standards are as follows.

◯ (good): In each of the water contact angle and the oleic acid contact angle, the difference from the initial contact angle is less than 10%.

Δ (acceptable): In either the water contact angle or the oleic acid contact angle, the difference from the initial contact angle is less than 10%.

x (poor): In each of the water contact angle and the oleic acid contact angle, the difference from the initial contact angle is at least 10%.

(Pencil hardness)

The pencil hardness of the surface of a hard coat layer was measured in accordance with JIS K5600-5-4; 1999 (ISO 15184; 1996) "Scratch hardness (pencil method)".

[Production of Compound (a)]
(Production of Compound (13-1-1))

In accordance with the method described in JP-A-2011-116947, paragraphs [0061] and [0062], from compound (53-1-1) (FLUOROLINK (registered trademark) C, manufactured by Solvay Solexis Inc.), a mixture comprising compound (13-1-1), compounds (23-1-1) and compound (33-1-1) was obtained.

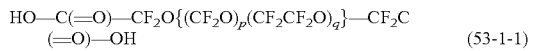  (53-1-1)

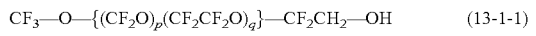  (13-1-1)

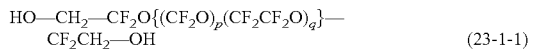  (23-1-1)

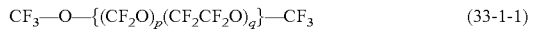  (33-1-1)

Here, p/q=0.6, and p+q≈15.

The mixture was developed by silica gel column chromatography (developing solvents: AC-2000 and AE-3000) to fractionate compound (13-1-1). Mn of compound (13-1-1) was 1,540.

[Compounds]
(Compound (b))

(b-1): HOCH$_2$CH$_2$OC(=O)CH=CH$_2$ (2-hydroxyethyl acrylate, manufactured by Nippon Shokubai Co., Ltd.).

(Polyisocyanate (c))

(c-1): Isocyanurate modified hexamethylene diisocyanate represented by the formula (6-1) (DURANATE (registered trademark) TKA-100, manufactured by Asahi Kasei Chemicals Corporation, cyclic trimer of hexamethylene diisocyanate, isocyanate group content: 21.8 mass %).

(Solvent (S1))

(S1-1): Mixture of CF$_3$CF$_2$CHCl$_2$ and CClF$_2$CF$_2$CHClF (ASAHIKLIN (registered trademark) AK-225, manufactured by Asahi Glass Company, Limited, boiling point: 54 to 56° C.).

(Urethanization Catalyst)

DBTDL: Dibutyltin dilaurate.

(Solvents)

(s-1): 1,1,2,2,3,3,4-heptafluorocyclopentane (ZEORORA (registered trademark) H, manufactured by Zeon Corporation, boiling point: 82.5° C.), (s-2): Propylene glycol monomethyl ether (boiling point: 120° C.).

(s-3): 2,2,3,3-tetrafluoropropanol.

(Photopolymerizable Compounds)

(m-1): Dipentaerythritol hexaacrylate, (m-2): Tris(acryloyloxyethyl) isocyanurate.

(Photopolymerization Initiator)

(i-1): 2-methyl-1-{4-(methylthio)phenyl}-2-morpholinopropan-1-one.

Ex. 1

(Production of Fluorinated Compound-Containing Composition)

Into a 50 mL two necked flask equipped with a stirrer, 1.0 g of triisocyanate (c-1) and 6.0 g of solvent (S1-1) were put, and 7.5 mg of DBTDL and 0.3 mg of 2,6-di-tert-butyl-p-cresol were added. While stirring at 40° C. in a nitrogen atmosphere, a solution having 0.94 g of compound (13-1-1) dissolved in 1.0 g of solvent (S1-1), was dropwise added over 1 hour, followed by stirring at 40° C. for 12 hours. 0.656 g of compound (b-1) was dropwise added in 2 minutes, followed by stirring for 12 hours. By the infrared absorption spectrum, it was confirmed that the absorption of isocyanate groups completely disappeared.

By a rotary evaporator, solvent (S1-1) was distilled off under reduced pressure. During the distillation under reduced pressure, no foaming was observed, and the distillation was completed in 15 minutes. 9.8 g of a mixed solvent of solvent (s-1): solvent (s-2)=5:3 (mass ratio) was added to obtain a fluorinated compound-containing composition. By the gas chromatography analysis, it was confirmed that 1 mass % of compound (b-1) was contained in the fluorinated compound-containing composition.

(Preparation of Hard Coat Layer-Forming Composition)

Into a 30 mL vial tube, 1 mg of the fluorinated compound-containing composition, 94 mg of photopolymerizable compound (m-1), 94 mg of photopolymerizable compound (m-2), 11 mg of photopolymerization initiator (i-1), 18 mg of solvent (s-3) and 117 mg of solvent (s-2) were put, followed by stirring for 1 hour at room temperature in a light shielded state, to obtain a hard coat layer-forming composition.

(Formation of Hard Coat Layer)

On the surface of a polyethylene terephthalate substrate, the hard coat layer-forming composition was applied by bar coating to form a coating film, which was then dried on a hot plate of 50° C. for 1 minute, to form a dried film on the surface of the substrate. Using a high pressure mercury lamp, UV (light amount: 300 mJ/cm$^2$, accumulated energy of UV with a wavelength of 365 nm) was irradiated, to form a hard coat layer having a thickness of 5 μm on the surface of the substrate.

The evaluation results of the hard coat layer-forming composition and the hard coat layer are shown in Table 1.

Ex. 2

In the same manner as in Ex. 1 except that the amount of compound (b-1) dropwise added, was changed to 0.533 g, triisocyanate (c-1) and compound (13-1-1) were reacted, and then compound (b-1) was further reacted. By the infrared absorption spectrum, it was confirmed that the absorption of isocyanate groups completely disappeared.

By a rotary evaporator, solvent (S1-1) was distilled off under reduced pressure. The solution foamed during the distillation under reduced pressure, and it was not possible to lower the degree of vacuum. The distillation was completed in 60 minutes. 9.9 g of a mixed solvent of solvent (s-1):solvent (s-2)=5:3 (mass ratio) was added to obtain a fluorinated compound-containing composition. By the gas chromatography analysis, it was confirmed that 0.01 mass % of compound (b-1) was contained in the fluorinated compound-containing composition.

Except that the fluorinated compound-containing composition was changed to the one in Ex. 2, a hard coat layer-forming composition was prepared in the same manner as in Ex. 1, and a hard coat layer was formed. The evaluation results of the hard coat layer-forming composition and the hard coat layer are shown in Table 1.

Ex. 3

In the same manner as in Ex. 1 except that the amount of compound (b-1) dropwise added, was changed to 1.77 g, triisocyanate (c-1) and compound (13-1-1) were reacted and then, compound (b-1) was further reacted. By the infrared absorption spectrum, it was confirmed that the absorption of isocyanate groups completely disappeared.

By a rotary evaporator, solvent (S1-1) was distilled off under reduced pressure. The distillation was completed in 15 minutes. 8.66 g of a mixed solvent of solvent (s-1):solvent (s-2)=5:3 (mass ratio) was added to obtain a fluorinated corn pound-containing composition. The fluorinated compound-containing composition was cloudy. By the gas chromatography analysis, it was confirmed that 10 mass % of compound (b-1) was contained in the fluorinated compound-containing composition.

Except that the fluorinated compound-containing composition was changed to the one in Ex. 3, a hard coat layer-forming composition was prepared in the same manner as in Ex. 1, and a hard coat layer was formed. The evaluation results of the hard coat layer-forming composition and the hard coat layer are shown in Table 1.

In the fluorinated compound-containing composition in Ex. 3, the content of the compound (B) having low compatibility exceeded 2 mass %, whereby the fluorinated compound-containing compositions became cloudy. Further, the storage stability was insufficient, and the appearance of the formed hard coat layer was also insufficient.

INDUSTRIAL APPLICABILITY

The fluorinated compound-containing composition of the present invention can be suitably used to impart excellent antifouling properties to an object (such as a hard coat layer). Further, by mixing it with a resin material, it may be used for applications to impart antifouling properties to a molded product, as a release agent of a mold, etc., to prevent oil leakage for bearings, etc., to prevent adhesion of a process solution at the time of processing an electronic component, etc., or to prevent moisture for a workpiece.

This application is a continuation of PCT Application No. PCT/JP2016/063465, filed on Apr. 28, 2016, which is based upon and claims the benefit of priority from Japanese Patent Application No. 2015-092930 filed on Apr. 30, 2015. The contents of those applications are incorporated herein by reference in their entireties.

What is claimed is:
1. A composition, comprising:
a fluorinated compound (A) having a portion derived from a compound (a) having a poly(oxyperfluoroalkylene) chain and an active hydrogen-containing group, a portion derived from a compound (b) having a polymerizable carbon-carbon double bond and an active hydrogen-containing group, and a portion derived from a polyisocyanate (c), the fluorinated compound (A) having no isocyanate group;
a compound (B) having a polymerizable carbon-carbon double bond and an active hydrogen-containing group; and
a solvent (S1),
wherein an amount of the fluorinated compound (A) in the composition is from 5 to 30 mass % to the composition, and

TABLE 1

|  | Ex. 1 | Ex. 2 | Ex. 3 |
| --- | --- | --- | --- |
| Content of compound (b-1) [mass %] | 1 | 0.01 | 10 |
| Appearance of fluorinated compound-containing composition | Transparent | Transparent | Cloudy |
| Foaming during distillation of reaction solvent | No | Yes | No |
| Distillation time for reaction solvent [min] | 15 | 60 | 15 |
| Compatibility | ◯ | ◯ | X |
| Storage stability | ◯ | ◯ | X |
| Appearance of hard coat layer | ◯ | ◯ | X |
| Fingerprint stain removability | ◯ | ◯ | ◯ |
| Oily ink repellency | ◯ | Δ | ◯ |
| Abrasion resistance | ◯ | ◯ | ◯ |
| Pencil hardness | 2H | 2H | 2H |

The fluorinated compound-containing composition in Ex. 1 contained at least 0.1 mass % of the compound (B), whereby foaming at the time of distilling off the reaction solvent (x) was suppressed.

In the fluorinated compound-containing composition in Ex. 2, the content of the compound (B) was less than 0.1 mass %, whereby the solution foamed at the time of distilling off the reaction solvent (x), and it took time for the distillation.

an amount of the compound (B) is from 0.1 to 2 mass % to the composition.

2. The composition according to claim 1, wherein the compound (B) comprises the compound (b).

3. The composition according to claim 1, wherein the compound (B) comprises a compound other than the compound (b), and each of the compound (b) and the compound other than the compound (b) has one hydroxy group.

4. The composition according to claim 1, wherein the compound (a) has one hydroxy group.

5. A method for producing a composition of claim 1, comprising:
reacting the compound (a), the compound (b) and the polyisocyanate (c) in the solvent (S1), wherein an amount of the polyisocyanate (c) is equal to or greater than an amount of the compound (a) in chemical equivalent, and less than a total amount of the compound (a) and the compound (b) in chemical equivalent and optionally,
after completion of the reaction, by adding the compound (B), adjusting a total amount of an unreacted compound (b) and the optionally-added compound (B) such that the composition includes from 5 to 30 mass % of the fluorinated compound (A) and 0.1 to 2 mass % of the compound (B).

6. The method according to claim 5, wherein the reacting of the compound (a), the compound (b) and the polyisocyanate (c) comprises reacting the compound (a) and an excess amount in chemical equivalent of the polyisocyanate (c) in the solvent (S1) to produce a reaction intermediate having an isocyanate group, and then, adding the compound (b) in an amount exceeding an equal amount of the reaction intermediate in chemical equivalent to react the compound (b) and the reaction intermediate.

7. The method according to claim 6, wherein the amount of the compound (b) used in the reacting is adjusted such that the amount of the compound (B) is from 0.1 to 2 mass % without adding the compound (B) after completion of the reaction.

8. A composition, comprising:
a fluorinated compound (A) having a portion derived from a compound (a) having a poly(oxyperfluoroalkylene) chain and an active hydrogen-containing group, a portion derived from a compound (b) having a polymerizable carbon-carbon double bond and an active hydrogen-containing group, and a portion derived from a polyisocyanate (c), the fluorinated compound (A) having no isocyanate group;
a compound (B) having a polymerizable carbon-carbon double bond and an active hydrogen-containing group; and
a solvent (S2) comprising a non-fluorinated organic solvent or a fluorinated organic solvent having an active hydrogen-containing group,
wherein an amount of the fluorinated compound (A) in the composition is from 5 to 30 mass % to the composition, and
an amount of the compound (B) is from 0.1 to 2 mass % to the composition.

9. The method of claim 5, wherein
at least a part of the solvent (S1) is substituted by a solvent (S2) comprising a non-fluorinated organic solvent or a fluorinated organic solvent having an active hydrogen-containing group.

10. A coating liquid, comprising:
the composition of claim 1;
a photopolymerizable compound, which is other than the fluorinated compound (A) and the compound (B); and
a photopolymerization initiator.

11. A coating liquid, comprising:
the composition of claim 8;
a photopolymerizable compound, which is other than the fluorinated compound (A) and the compound (B); and
a photopolymerization initiator.

12. A hard coat layer formed from the coating liquid of claim 10.

13. A hard coat layer formed from the coating liquid of claim 11.

14. An article, comprising:
a substrate; and
the hard coat layer of claim 12.

15. An article, comprising:
a substrate; and
the hard coat layer of claim 13.

16. The composition according to claim 1, wherein the amount of the fluorinated compound (A) in the composition is from 5 to 25 mass % to the composition, and the amount of the compound (B) is from 0.1 to 1.5 mass % to the composition.

17. The composition according to claim 1, wherein the amount of the fluorinated compound (A) in the composition is from 10 to 20 mass % to the composition, and the amount of the compound (B) is from 0.5 to 1.1 mass % to the composition.

* * * * *